United States Patent [19]

Ikeura

[11] Patent Number: 5,143,030

[45] Date of Patent: Sep. 1, 1992

[54] VARIABLE CAM ENGINE

[75] Inventor: Kenji Ikeura, Kanagawa, Japan

[73] Assignee: Nissan Motor Co., Ltd., Yokohama, Japan

[21] Appl. No.: 795,850

[22] Filed: Nov. 21, 1991

[30] Foreign Application Priority Data

Nov. 21, 1990 [JP] Japan .................................. 2-316739

[51] Int. Cl.$^5$ .............................................. F01L 1/34
[52] U.S. Cl. .................................................. 123/90.16
[58] Field of Search ................. 123/90.15, 90.16, 90.17

[56] References Cited

U.S. PATENT DOCUMENTS

| | | | |
|---|---|---|---|
| 4,917,057 | 4/1990 | Seki | 123/90.16 |
| 4,962,732 | 10/1990 | Inoue et al. | 123/90.16 |
| 4,996,954 | 3/1991 | Seki et al. | 123/90.16 |
| 5,009,203 | 4/1991 | Seki | 123/90.16 |
| 5,024,191 | 6/1991 | Nagahiro et al. | 123/90.16 |

FOREIGN PATENT DOCUMENTS

63-167016  7/1988  Japan .

Primary Examiner—E. Rollins Cross
Assistant Examiner—Weilun Lo
Attorney, Agent, or Firm—Foley & Lardner

[57] ABSTRACT

This invention relates to a variable cam engine of which each cylinder has at least one valve driven by multiplicity of cams which give different engine torque outputs. This invention provides an engine comprising a decision-making device which decides change-over of the cams along with a selection of a target cam according to the engine running conditions, a cam change-over mechanism which disengages a current cam from the valve and engages said target cam instead, a crank shaft angle sensor, a sequential control device which, when the cam change-over is made at an engine speed below a predetermined speed, actuates the cam change-over mechanism at predetermined intervals starting form a specific cylinder and proceeding in turn through the other cylinders, and a regulating device which regulates the combustion in each cylinder corresponding to the cam change-over. The fuel supply quantity and ignition period are thereby regulated according to the cam change-over for each cylinder, a torque step due to the cam change-over is prevented, and the cam change-over takes place smoothly.

4 Claims, 9 Drawing Sheets

VARIABLE CAM ENGINE

FIELD OF THE INVENTION

This invention relates to an engine wherein the characteristics of the cams driving the air intake or exhaust valves can be selected according to the running condition of the engine, and more particularly, to a control system for controlling the engine power when a cam change-over is made.

BACKGROUND OF THE INVENTION

The optimum timing of the air intake and exhaust valves of an engine differ according to the running conditions of the engine. At high speed, for example, a large valve lift and a long valve opening period are required in order to obtain large torque, while at low speed, a comparatively small valve lift and short opening period are required. Due to these differences, the running conditions of engines such as car engines vary widely. It was therefore impossible to design a valve drive cam which gives optimum performance for all running conditions.

In Tokkai Sho 63-167016 (Koho) published by the Japanese Patent Office, a variable cam engine is proposed wherein several cams with different shapes are provided, and the optimum valve timing is obtained by selecting these cams depending on the engine running conditions.

In such a variable cam engine, high torque output is obtained from low to high speed by providing a low speed power cam which gives high torque at low speed and a high speed power cam which high torque at high speed, and changing over between the two depending on the engine speed. In addition, an economy cam which has still smaller valve lift and shorter opening period than the low speed power cam has also been proposed to improved fuel cost performance of engine on partial load.

Conventionally, the change-over between these cams was made by simultaneously driving cam selection actuators provided for each cylinder of the engine.

A certain time was however required from the time when a cam change-over command was issued until the time when the change-over was actually completed, and as a change-over could not be performed depending on the range of crankshaft angle, cam change-over was not necessarily completed at the same time for all the cylinders.

It was therefore difficult to specify precisely which cam was being used for each cylinder immediately after issuing a change-over command.

When a cam change-over is made, the air charging efficiency of a cylinder varies according to the cam characteristics even if the throttle opening does not change, so the required fuel quantity and ignition period also vary.

If however it is not possible to specify precisely which cam is being used as described heretofore, it is also impossible to control the fuel supply quantity and ignition period to optimum values. This therefore produced a torque shock after making a change-over and adversely affected the composition of the exhaust gas. This shock had a greater effect for lower engine speeds.

If the change-over were made in synchronization with the engine revolution for each cylinder in turn starting with a specific cylinder, the fuel supply quantity and ignition period could be regulated correctly and the change-over would be smooth. In this case, however, the change-over must be completed within a limited range of crankshaft angles, and especially at high speed, the time period during which the change-over can be made is extremely short. This requires an actuator with a very fast response, high speed input sensing, rapid processing by the CPU and other high performance equipment, therefore even if this could be accomplished it would naturally be very costly.

SUMMARY OF THE INVENTION

It is therefore an object of the invention to change over cams on each cylinder sequentially in synchronization with the engine revolution, and to change the fuel supply quantity and ignition period to correspond with the change-over in the case of low engine speeds, while on the other hand to change the fuel supply quantity and ignition period after changing over cams on all cylinders simultaneously without synchronizing with the engine revolution in the case of high engine speeds.

This does not require a fast response, and consequently a low cost system can be designed to perform a stable cam change-over which does not involve a large torque difference.

To achieve the above object, this invention provides a variable cam engine of which each cylinder has at least one valve driven by multiplicity of cams which give different engine torque outputs. This engine comprises decision-making means which decides change-over of the cams along with a selection of a target cam according to the engine running conditions, a cam change-over mechanism which disengages a current cam from the valve and engages the target cam instead, sensing means to sense crank shaft angle of the engine, sequential control means which, when the cam change-over is made at an engine speed below a predetermined speed, actuates the cam change-over mechanism at predetermined intervals starting from a specific cylinder and proceeding in turn through the other cylinders, and regulating means which regulates the combustion in each cylinder corresponding to the cam change-over.

This invention also provides a variable cam engine similar to the above, but further comprises simultaneous control means which, at engine above a predetermined speed, overrides the sequential control means and actuates the cam change-over mechanisms for all cylinders simultaneously.

DESCRIPTION OF THE PREFERRED EMBODIMENTS

Figure 1:
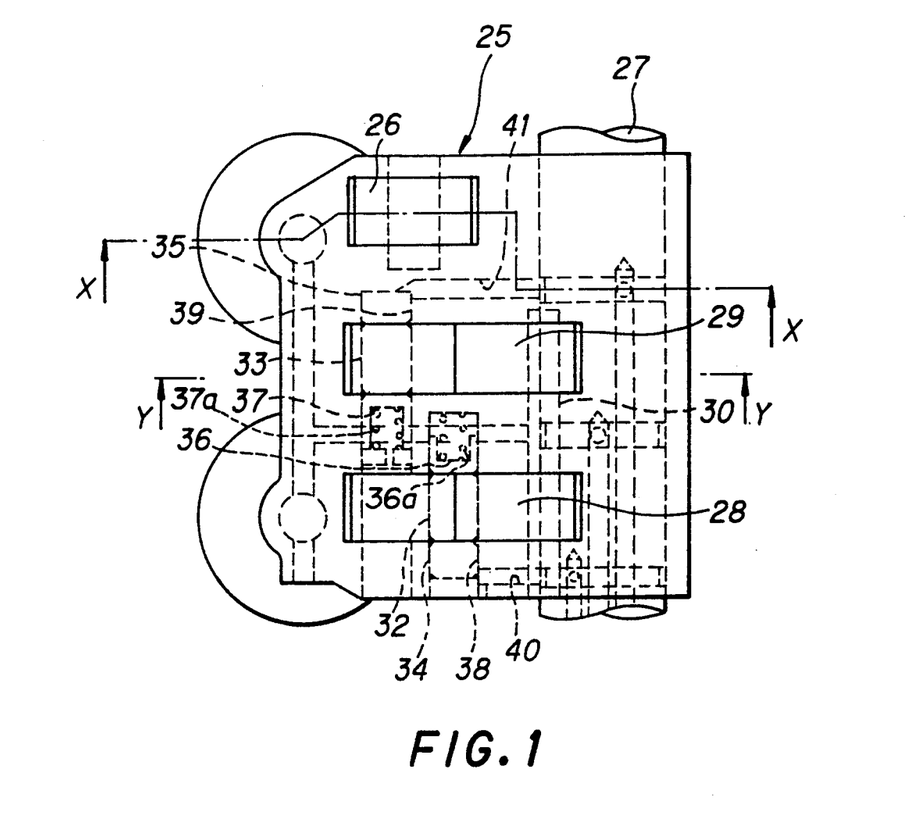
FIG. 1 is a plan view of a cam selecting mechanism of a variable cam engine with a power control mechanism according to this invention.
Figure 2:
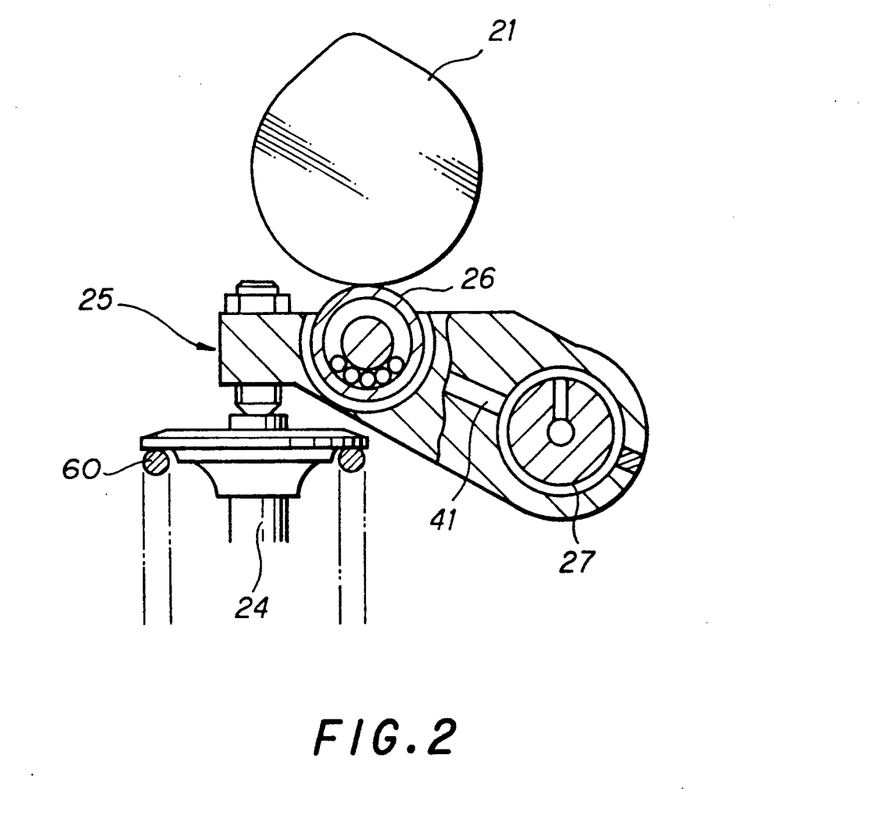
FIG. 2 shows a section through the line X—X in FIG. 1.
Figure 3:
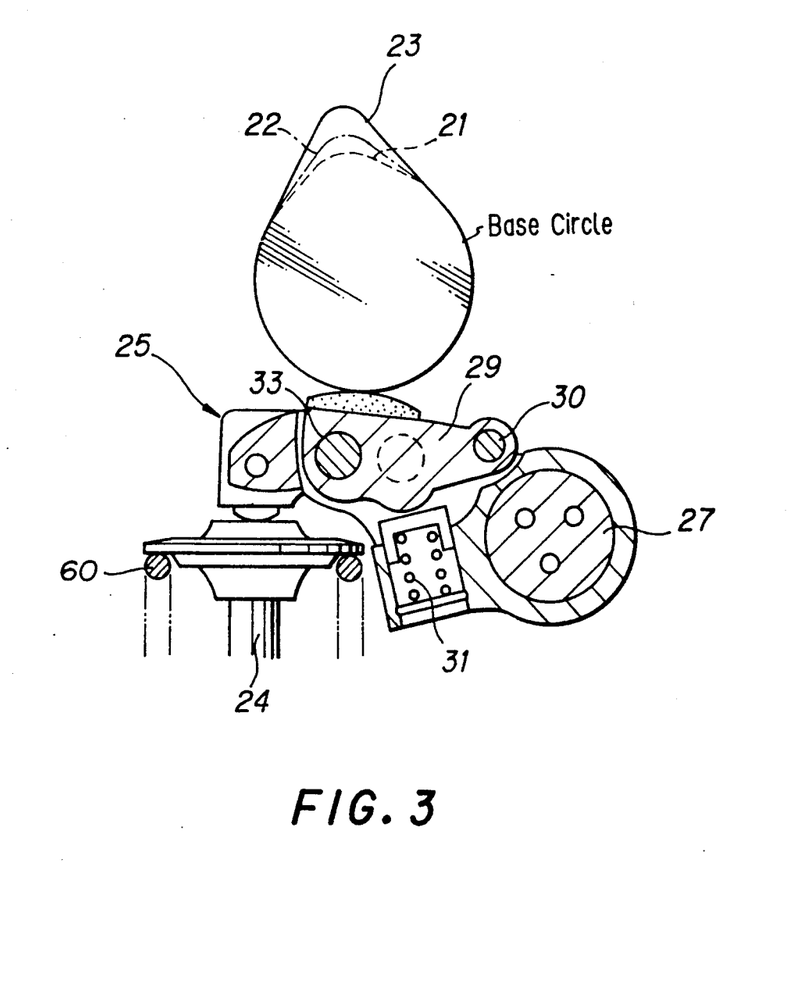
FIG. 3 shows a section through the line Y—Y in FIG. 1.

FIGS. 1, 2 and 3 show the structure of the cam selecting mechanism.

A first cam 21 (economy cam) has a shape which gives both a small cam lift amount and short lift period, and is set such that it gives good fuel cost performance on partial load. A second cam 22 (low speed power cam) has a shape which gives a larger cam lift among and longer lift period than the first cam 21, and is set such that it generates a large torque at low speeds. A third cam 23 (high speed power cam) has a shape which gives a still higher lift amount and longer lift period than the second cam 22, and is set such that it generates a large torque at high speeds.

Figure 4:
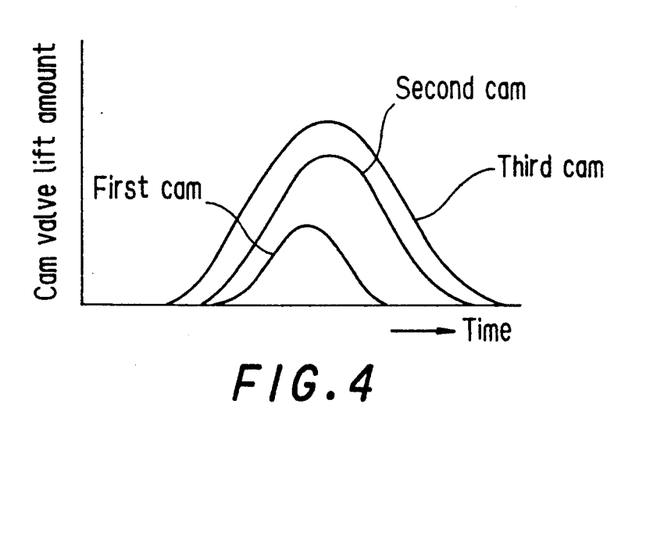
FIG. 4 is a graph showing cam lift characteristics of the variable cam engine with the power control mechanism according to this invention.

The lift characteristics of these cams 21-23 are shown in FIG. 4. The base circle positions of cams 21-23 which are shown in FIG. 3 represent the non-lift intervals of these cams.

These cams 21, 22, 23 are arranged in series on the same cam shaft, not shown, and rotate together in synchronism with the engine revolution.

An air intake valve 24 is elastically supported in a closed position by a spring 61, and opened by a main rocker arm 25 which pivots about a rocker shaft 27 supported by the engine cylinder head.

A roller 26 is attached to the main rocker arm 25 such that it can rotate freely. As shown in FIG. 2, the first cam 21 is in contact with this roller 26 and pushes the main rocker arm 25 down according to its rotation position to open the valve 24 against the force of the spring 61.

Two parallel grooves are formed on one side of the roller 26 in the main rocker arm 25. In these grooves, two sub-rocker arms 28 and 29 are provided which pivot about a common shaft 30 that is supported by the main rocker arm 25.

The sub-rocker arm 29 is supported such that it is in contact with the third cam 23 by a spring 31 inserted between the sub-rocker arm 29 and the main rocker arm 25 as shown in FIG. 3. Similarly, the sub-rocker arm 28 is supported such that is in contact with the second cam 22 under the force of another spring. The sub-rocker arms 29 and 28 therefore pivot about the shaft 30 according to the rotation of the cams 23 and 22 respectively.

A cylindrical pin 33 is inserted in a channel running horizontally through the sub-rocker arm 29 such that it is free to slide on the inside of the channel. A hydraulic chamber 39 of the same cross-section as this channel opens onto the inside of the groove in the main rocker arm 25 which accommodates the sub-rocker arm 29, and another pin 35 of the same cross-section as the pin 33 is free to slide on the inner surface of the chamber 39. The pins 33 and 35 are positioned coaxially in the base circle position of the third cam 23 coresponding to its non-lift position shown in FIG. 3.

A hole of the same cross-section as the aforesaid channel and the hydraulic chamber 39 of the sub-rocker arm 29 is provided in the opposite wall to the hydraulic chamber 39 of the groove housing the sub-rocker arm 29. A plunger 37 is inserted in this hole under the force of a return spring 37a.

When there is no pressurized oil acting on the hydraulic chamber 39, the pins 33 and 35 are pushed by the plunger 37 which is under the force of the return spring 37a so that they are held respectively in the channel of the sub-rocker arm 29 and the hydraulic chamber 39. In this state, the sub-rocker arm 29 can pivot freely with respect to the main rocker arm 25 according to the rotation of the third cam 23.

When pressurized oil is led through a passage 41 into the hydraulic chamber 39 in the base circle position of the third cam 23, the pins 35 and 33 which are positioned coaxially are pushed out by a predetermined distance against the force of the return spring 37a. Part of the pin 35 then enters the channel in the sub-rocker arm 29 and part of the pin 33 enters the hole in the main rocker arm housing the plunger 37 causing the sub-rocker arm 29 to engage with the main rocker arm 25.

Similarly, the sub-rocker arm 28 is caused to engage selectively with the main rocker arm 25 by means of an engaging mechanism which comprises pins 32 and 34, a return spring 36a, a plunger 36, a hydraulic chamber 38 and a passage 40.

When the sub-rocker arm 29 is engaged with the main rocker arm 25, the valve 24 opens and closes according to the motion of the third cam 23.

When the sub-rocker arm 29 is not engaged with the main rocker arm 25 and the sub-rocker arm 28 is engaged with the main rocker arm 25, the valve 24 opens and closes according to the motion of the second cam 22.

When neither of the sub-rocker arms 28 and 29 are engaged with the main rocker arm 25, the valve 24 opens and closes according to the motion of the first cam 21.

In all cases, when the cams 21-23 are in the base circle position as shown in FIGS. 2 and 3, the main rocker arm 25, and the sub-rocker arms 28 and 29 are all in the non-lift position so that the air intake valve 24 is closed. Change-overs between the cams 21-23 are made during this non-lift interval.

Figure 5:
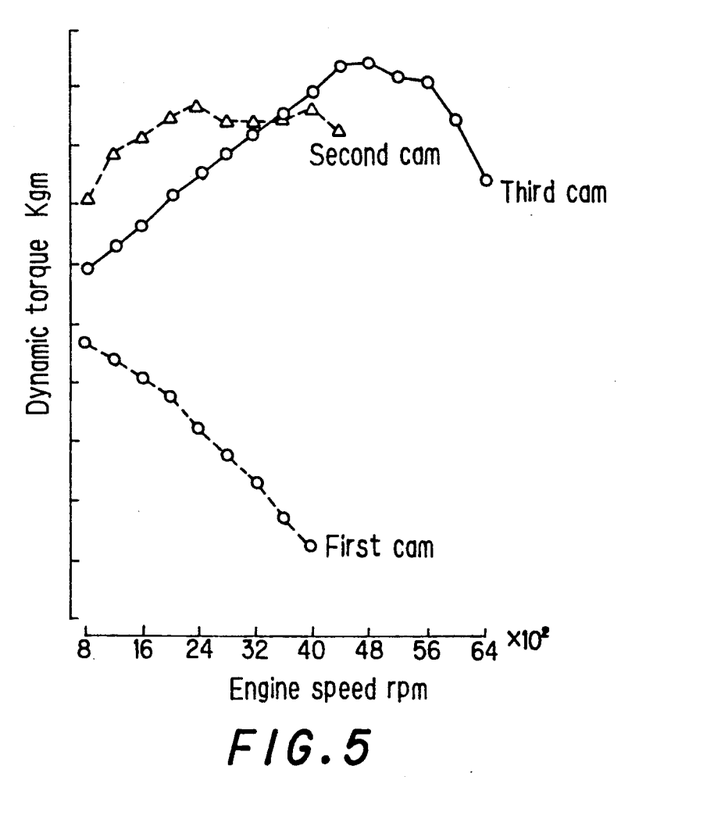
FIG. 5 is a graph showing output characteristics on full throttle of the variable cam engine with the power control mechanism according to this invention.

FIG. 5 shows the torque characteristics of the cams 21-23 at full throttle. The first cam 21 generates a small torque over the whole range of speeds but it gives good fuel cost performance. The second cam 22 generates its maximum torque in the low speed region, while the third cam 23 generates its maximum torque in the high speed region.

Figure 6:
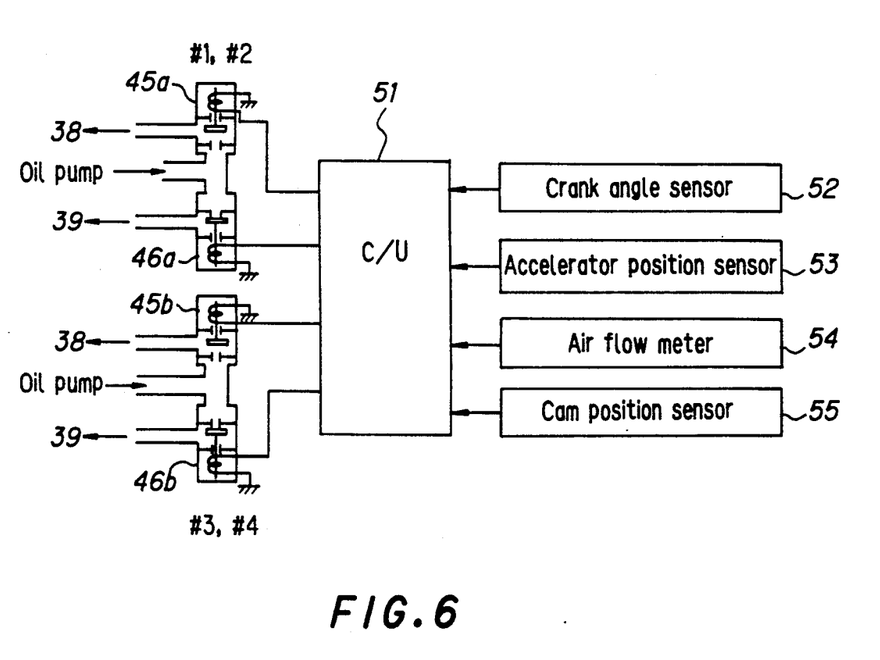
FIG. 6 is a schematic diagram of the power control mechanism according to this invention.

The change-overs between the 21, 22 and 23 are performed by a control unit 51 as shown in FIG. 6.

The control unit 51 is provided with a control map shown in FIG. 5 which sets the regions in which change-overs between the cams 21-23 are to be made, and it controls cam change-overs according to the running condition of the engine. The control unit 51 is supplied with signals indicative of crankshaft angle from a crankshaft angle sensor 52, accelerator depression amount from an accelerator position sensor 53, intake air volume from an air flow meter 54, and a current active cam from a cam position sensor 55.

Selection of the cams 21-23 by the control unit 51 takes place as follows. If the required torque indicated by the signal from the accelerator position sensor 53 and the engine speed obtained from the signal from the crankshaft angle sensor 52 are in the region of the first cam 21, i.e. the economy cam, this cam 21 is selected.

If the accelerator depression is then increased so that the required torque shifts to the region of the second cam 22, i.e. the low speed power cam, this cam 22 is selected.

If the engine rotation speed then increases from low speed to high speed, the third cam 23, i.e. the high speed power cam, is selected.

In this embodiment, the engine has four cylinders and each of these cylinders is equipped with these cams 21-23 and cam change-over mechanism. The cam change-overs on all of the cylinders are controlled by the control unit 51 via solenoid valves 45a, 45b, 46a and 46b.

Cam change-overs for the cylinders #1 and #2 are performed by the opening and closing of the solenoid valves 45a and 46a, whereas cam change-overs for the cylinders #3 and #4 are performed by the opening and closing of the solenoid valves 45b and 46b.

When for example the solenoid valve 45a is opened, pressurized oil is led from the oil pump to the hydraulic chamber 38 of the cylinders #1 and #2 so as to cause the sub-rocker arm 28 to engage with the main rocker arm 25. When on the other hand the solenoid valve 46a is opened, pressurized oil is led from the oil pump to the hydraulic chamber 39 of the cylinders #1 and #2 so as to cause the sub-rocker arm 29 to engage with the main rocker arm 25. The cams 21-23 are selected depending on these engaged positions as described hereintofore. Similarly, the cams for the cylinders #3 and #4 are selected by the opening and closing of the solenoid valves 45b and 46b.

When change-overs are made between these solenoid valves 45a-46b, if the engine speed obtained from the input by the crank shaft angle sensor 52 is below a predetermined value, the control unit 51 performs a cam change-over for a pair of specific cylinders #3 and #4 for example, according to the crankshaft angle input by the crankshaft angle sensor 52. Then it performs a cam change-over for the other pair of cylinders #1 and #2.

If on the other hand the engine is running at a high speed which is higher than a predetermined value, the control unit 51 changes over the cams for all the cylinders #1-#4 simultaneously.

If a change-over between the second cam 22 and the third cam 23 is performed at a throttle opening such that the torque generated by both cams is the same, the change-over is smooth.

If a change-over is made between a power cam and the economy cam where no such throttle opening exists, i.e. between the second cam 22 or the third cam 23 and the economy cam 21, however, a torque step is produced regardless of the throttle opening and the exhaust gas composition is adversely affected.

To prevent this phenomenon from occurring, the control unit 51 corrects the fuel injection quantity and the fuel ignition period for each cylinder corresponding to the cam change-over.

At low engine speeds therefore, when a cam change-over is performed for each cylinder in turn starting from a specific cylinder, the corrections of fuel injection quantity and ignition period are also carried out for each cylinder in turn, whereas at high engine speeds when cam change-over is performed simultaneously for all the cylinders, these corrections are also carried out simultaneously.

Figure 7:
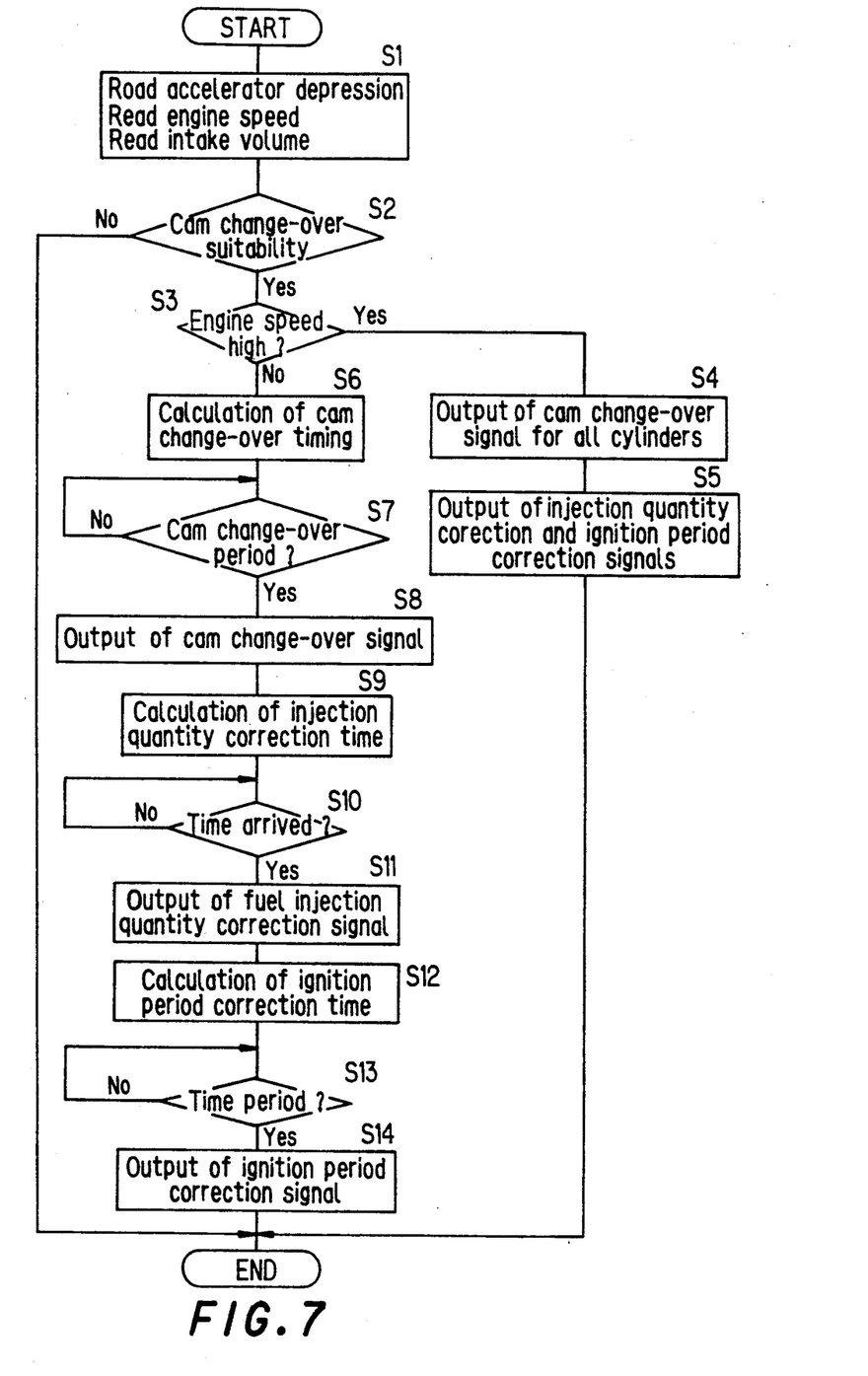
FIG. 7 is a flowchart showing a control process of the power control mechanism according to this invention.

The control action carried out by the control unit 51 will now be described with reference to FIG. 7.

Figure 10:
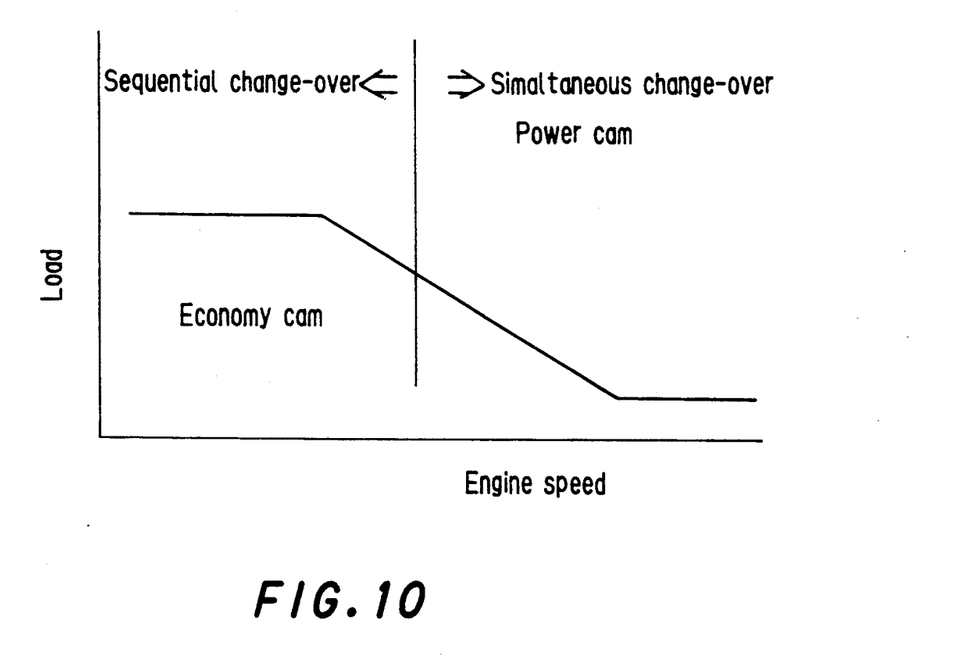
FIG. 10 is a graph showing the boundary between the cam change-over sequential control and simultaneous control by the power control mechanism according to this invention.

First, in a step S1, the control unit 51 reads engine running conditions such as the accelerator depression, crankshaft angle and air intake volume, while in a step S2, the cam change-over is decided according to a previously set cam usage area. When the cam change-over has been selected, if the engine speed is higher than a predetermined value, a cam change-over signal is output to all the cylinders as is also shown in FIG. 10, and the fuel injection quantity and ignition period are adjusted for all the cylinders (S3-S5).

In the aforesaid case, the actual fuel injection quantity and ignition period correction are computed based on the engine speed and intake air volume.

If on the other hand the engine speed is lower than a predetermined value, a change-over period based on the crankshaft angular position is computed in a step 6 such that the cam change-over is performed for each cylinder in turn starting from a specific cylinder.

Figure 8:
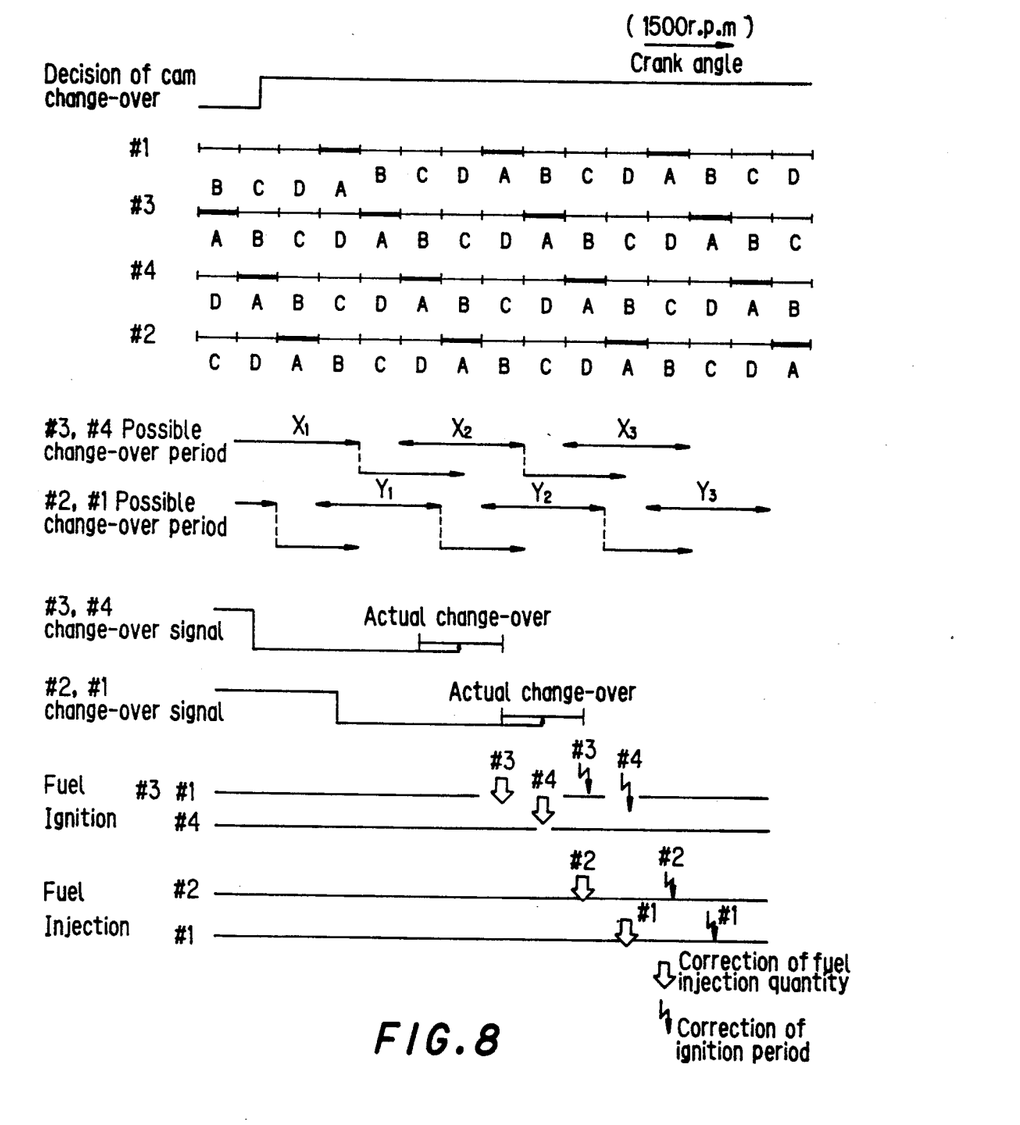
FIG. 8 is a cam selection timing chart for each cylinder provided with the power control mechanism according to this invention.

This computation is performed as follows. As shown in FIG. 8, the cams 21-23 are in their base circle positions within an angular range of 540° for the compression, combustion and exhaust processes, i.e. excepting air intake when the air intake valve 24 is lifting. The cam change-over operation via the solenoid valves 45b and 46b can therefore be performed within this 540° range shown by the line X1 in the figure. By performing the cam change-over within this range, the air intake valves 24 of the cylinders 3 and 4 are opened and closed by a new cam from their next cycle onwards.

In the case of cylinder 4, there is another range where cam change-over is possible 180° further on after X1, however as this interval corresponds to the air intake of the cylinder 3, a cam change-over for the cylinder 3 would be retarded by one cycle with respect to the cylinder 4 if a cam change-over were actually performed during this range. This range is therefore not included in the ranges where a cam change-over is possible.

Similarly, by performing a cam change-over for the cylinders #1 and #2 via the solenoid valves 45a and 46a in the range Y1 shown in the figure, the air intake valves 24 for these cylinders are opened and closed by a new cam from their next cycle onwards. In the step S6, the control unit 51 determines the cam change-over period based on the input signal from the crankshaft angle sensor 52. When it is judged that the determined period has arrived (S7), a change-over signal is output to the solenoid valves 45a-46b, and the cams for the cylinders 3, 4, 1 and 2 are changed over two cylinders at a time in this order (S8).

However, due to a response delay in the cam change-over mechanism, the change-over is not performed immediately following the signals output to the solenoid valves 45a-46b.

If this actuation delay is 100 ms ±20 ms, for example, one cycle is 40 ms when the engine speed is 1500 rpm as in the case of FIG. 8, so even if a signal is output to the solenoid valves 45b and 46b at the beginning of the interval X1, the cams are actually changed over during the interval X2. Hence, a new cam is used not for the air intake following the interval X1, but for the next air intake.

The control unit 51 computes the time required to actually perform the cam change-over from the outputting of the cam change-over signal based on the detected engine speed, and also computes when the fuel injection quantity and ignition period should be adjusted based on the crankshaft angular position. When these time periods arrive, a fuel injection quantity correction signal and an ignition period correction signal are output as shown in FIG. 8, and the fuel injection quantity and ignition period are adjusted accordingly (S9-S14) so that a corrected fuel quantity is injected in the first intake after completing the cam change-over and ignited at a corrected time period at each cylinder.

Figure 9:
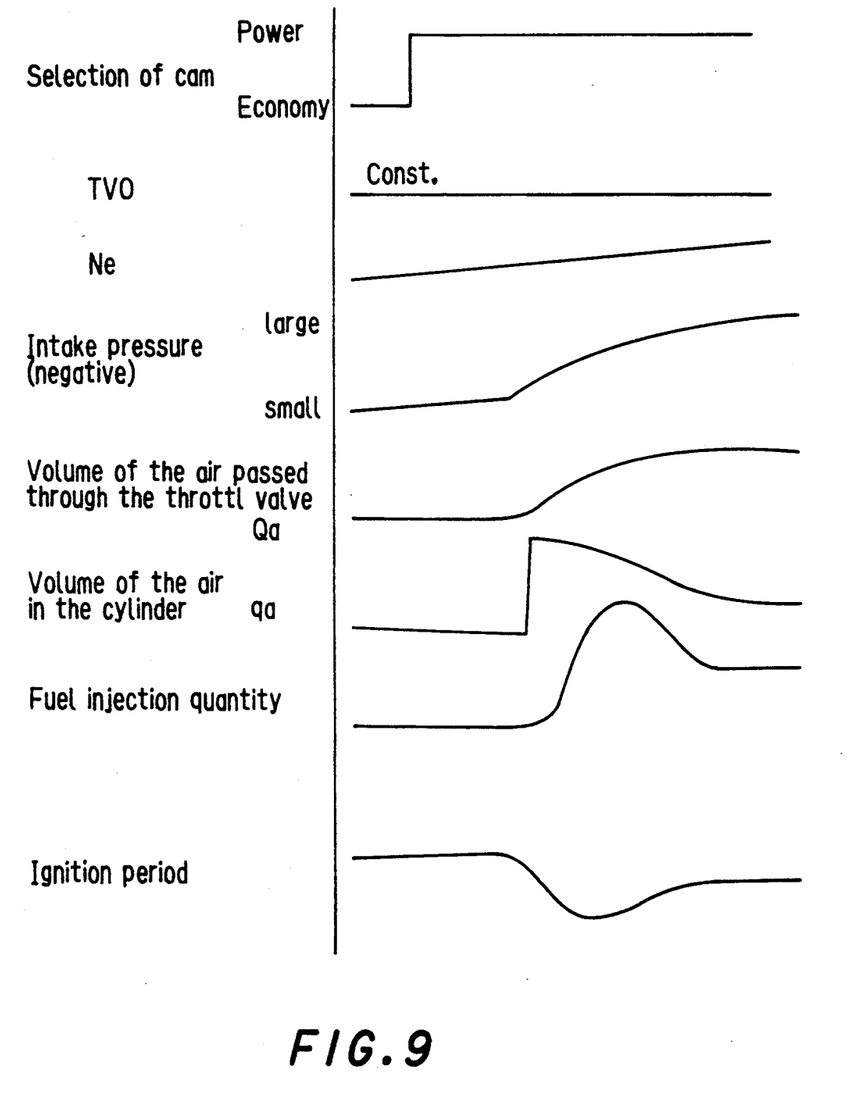
FIG. 9 is a timing chart showing how the fuel injection quantity and ignition period are corrected by the power control mechanism according to this invention.

FIG. 9 shows the required values of fuel supply quantity and ignition period when a change-over is made from the economy cam to a power cam. It is seen that even if the throttle opening and engine revolution speed do not vary after the cam change-over, the air charging efficiency of a cylinder is almost twice as large and therefore the air intake volume in the cylinder increases instantaneously.

If therefore the fuel supply quantity is not increased accordingly, the fuel quantity will be insufficient, and combustion may be adversely affected or ignition may fail.

Further, the required ignition period also varies accordingly, and the variation in the required values is particularly great immediately after making the cam change-over. However, if the fuel supply quantity and ignition period are corrected for each cylinder whenever a cam change-over is made, the torque variation due to the change-over can be controlled, the shock due to the change-over can be avoided, and the adverse affect on exhaust gas composition can be prevented.

As can be seen from FIG. 9, when a change-over is made from the economy cam to the power cam, the air volume aspirated into the cylinder is less in succeeding air intakes than it is in the first air intake immediately after making the change-over. This is due to the fact that air is introduced into the cylinder according to the characteristics of the power cam under the relatively weak intake load pressure which existed prior to the cam change-over, and the air charging efficiency therefore temporarily rises very sharply. Subsequently, due to the increase of intake load pressure, the air volume actually aspirated into the cylinder falls.

Thus, the maximum corrections of the fuel injection quantity and ignition period occur immediately after making the cam change-over, and subsequently there can be a return to the normal fuel supply quantity and ignition period corresponding to the new cam according to the air intake volume and the engine revolution speed.

As was described hereintofore, th cam change-over operation is performed in an interval of 540° C. In terms of time, this interval corresponds to 60 ms at an engine speed of 1500 rpm and to a mere 15 ms at an engine speed of 6000 rpm. If the cams are changed over sequentially at high engine speeds as at low engine speeds, therefore, the system must have an extremely small response delay which is either very difficult or very costly to realize in practice.

However, at high engine speeds, the combustion time interval for each cylinder is short and torque pulses are smoothed out. Hence even if a torque variation is produced by the cam change-over, there is not much effect on the overall oscillation, and even if the fuel supply quantity or ignition period for some cylinders does not coincide with the required values for a while because the cams for all of the cylinders are changed over at the same time, there is no problem in practice.

As described hereintofore, therefore, a system can be constructed economically without sacrificing performance by making the cam change-over for all cylinders together.

According to this embodiment, the can change-over at low engine speeds is performed two cylinders at a time, and as two sets of solenoid valves are therefore sufficient, the construction of the system can be simplified. Further as will be understood from FIG. 8, if it is desired to perform a cam change-over for a specific cylinder and it is performed for all cylinders together, the change-over operation is limited to 180° immediately before the air intake of the first cylinder for which the change-over is made. However, if the cam change-over is divided into two group, the interval during which a change-over is possible is then increased three times to 540°.

Further, according to the above embodiment, both the fuel injection quantity and ignition period are corrected after making the cam change-over, but even if only one of these parameters is corrected it will improve driving performance of the vehicle and the exhaust gas composition.

the foregoing description of a preferred embodiment for the purpose of illustrating this invention is not to be considered as limiting or restricting the invention, since many modifications, including application of this invention to exhaust valves, may be those skilled in the art without departing from the scope of the invention.

The embodiments of the invention in which an exclusive property or privilege is claimed are defined as follows:

1. A variable cam engine wherein each cylinder has at least one valve driven by multiplicity of cams which given different engine torque outputs, comprising:
    decision-making means which decides change-over of said cams along with a selection of a target cam according to the engine running conditions,
    a cam change-oer mechanism which disengages a current cam from said valve and engages said target cam instead,
    sensing means to sense crank shaft angle of the engine, sequential control means which, when said cam change-over is made at an engine speed below a predetermined speed, actuates said cam change-over mechanism at predetermined intervals starting from a specific cylinder and proceeding in turn through the other cylinders, and
    regulating means which regulates the combustion in each cylinder corresponding to said cam change-over.

2. A variable cam engine as defined in claim 1, wherein said regulating means is a fuel supply quantity correction mechanism.

3. A variable cam engine as defined in claim 1 wherein said regulating means is an ignition period correction mechanism.

4. A variable cam engine wherein each cylinder has at least one valve driven by multiplicity of cams which gave different engine torque outputs, comprising:
    decision-making means which decides change-over of said cams along with a selection of a target cam according to the engine running conditions,
    a cam change-over mechanism which disengages a current cam from said valve and engages said target cam instead,
    sensing means to sense crank shaft angle of the engine, sequential control means which, when said cam change-over is made at an engine speed below a predetermined speed, actuates said cam change-over mechanism at predetermine intervals starting from a specific cylinder and proceeding in turn through the other cylinders, simultaneous control means which, at engine speeds above said predetermined speed, overrides the sequential control means and actuates the cam change-over mechanisms for all cylinders simultaneously, and regulating means which regulates the combustion in each cylinder corresponding to the cam change-over.

* * * * *